United States Patent [19]

Allen

[11] 4,175,356

[45] Nov. 27, 1979

[54] PLANT AERATOR TUBE

[76] Inventor: Donovan J. Allen, Rte. 4, Berry Rd., Greer, S.C. 29651

[21] Appl. No.: 846,925

[22] Filed: Oct. 31, 1977

[51] Int. Cl.² .............................................. A01G 27/00
[52] U.S. Cl. ........................................................ 47/66
[58] Field of Search ..................... 47/66, 79, 80, 81, 19

[56] References Cited

U.S. PATENT DOCUMENTS

| 132,178 | 10/1872 | Pugh | 47/79 |
|---|---|---|---|
| 297,932 | 4/1884 | Groves et al. | 47/79 |
| 1,952,597 | 3/1934 | Lizzola | 47/79 |
| 3,117,442 | 1/1964 | Brooks | 47/79 X |
| 3,739,523 | 6/1973 | Tuffli | 47/81 |
| 4,067,143 | 1/1978 | Alwell | 47/79 |

FOREIGN PATENT DOCUMENTS

| 806918 | 6/1951 | Fed. Rep. of Germany | 47/79 |
|---|---|---|---|
| 2419703 | 4/1974 | Fed. Rep. of Germany | 47/81 |
| 63335 | 9/1955 | France | 47/79 |
| 696175 | 10/1965 | Italy | 47/81 |
| 403460 | 12/1933 | United Kingdom | 47/79 |

*Primary Examiner*—E. H. Eickholt
*Attorney, Agent, or Firm*—Bailey, Dority & Flint

[57] ABSTRACT

A plant aerator tube includes an elongated tubular member having opposed ends with a central axial bore extending between and through the ends. A plurality of radial openings communicate the interior of the bore with the exterior surrounding of the tubular member with a number of the openings being disposed below the surface of a plant support media when implanted therein so that air from above the media level is delivered to the root system of the plant supported in the media.

2 Claims, 3 Drawing Figures

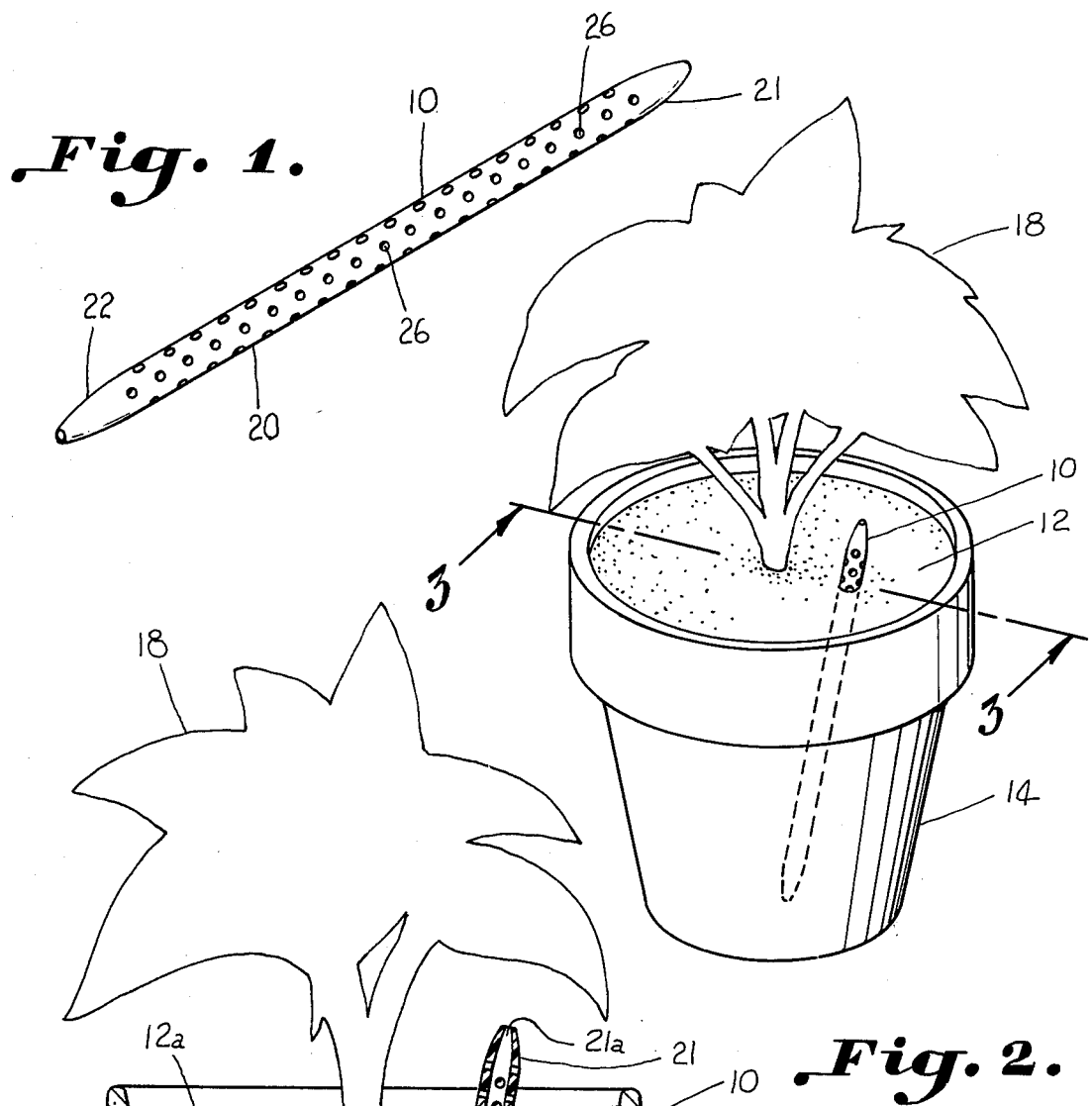
Fig. 1.
Fig. 2.
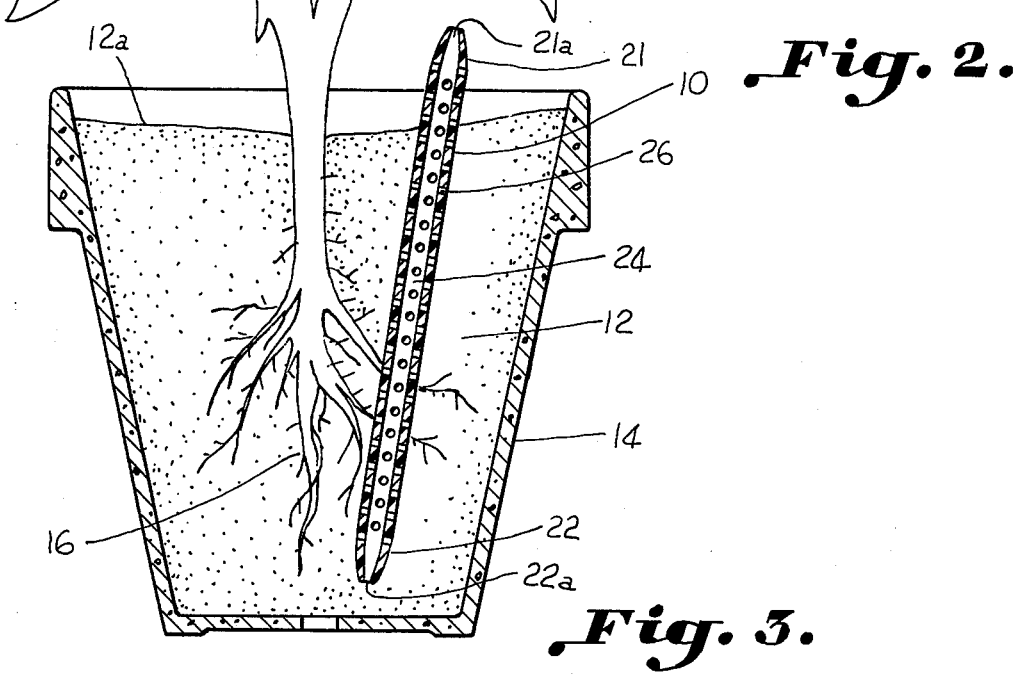
Fig. 3.

PLANT AERATOR TUBE

BACKGROUND OF THE INVENTION

The growing of plants in an inert or organic support media contained in a pot has become increasingly popular. Maintaining a healthy root system for successfully growing the plants indoors is a problem to which considerable attention need be given. Continued watering of pot plants causes the soil or other support media to pack down and form a crust at the surface. This causes a blockage preventing air from reaching the plant roots for life support. In addition, decay of the root system often results from improper drainage and aeration of the root system within the limited space of the container.

Accordingly, an important object of the present invention is to provide a device for aerating the root system of a plant growing in a support media in a container.

Another important object of the present invention is to provide a plant aerator tube for being implanted in a plant support media such as soil in a container having an axial bore and longitudinally spaced radial openings extending therefrom for delivering air from above the media and distributing the air at different levels to the plant root system supported in the media.

SUMMARY OF THE INVENTION

It has been found that an aerator tube for delivering air to the root system of a plant growing in a support media can be provided by an elongated tubular member having opposed ends with a central axial bore extending generally between the ends. One of the ends is tapered inwardly toward the central axis of the tubular member and terminates at a substantial point for being inserted into the media. A plurality of radial openings are formed in the side wall of the tubular member spaced generally along the entire length thereof communicating the interior of the axial bore with the exterior surrounding of the tubular member. With the tubular member implanted in the support media, a number of the openings are disposed below the surface of the media so that air above the media level is delivered and distributed at different levels to the root system supported in the media.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view of a plant aerator tube according to the present invention;

FIG. 2 is a perspective view illustrating an aerator tube according to the invention implanted in the support media of an associated potted plant; and FIG. 3 is a sectional view taken along line 3—3 of FIG. 2.

DESCRIPTION OF A PREFERRED EMBODIMENT

The invention relates to an aerator device for delivering air to the root system of an associated plant which is growing in a support media such as soil or an inert media utilized in a hydroponic system. The drawing illustrates an aerator device 10 implanted in a support media 12 contained within a pot 14 for aerating the root system 16 of an associated plant 18.

As illustrated, the aerator tube 10 includes an elongated tubular member 20, formed preferably from plastic, having opposed ends 21 and 22. A central axial bore 24 extends generally between the ends 21 and 22. It is preferred that at least one of the ends be tapered inwardly toward the central axis of the tube 20 terminating at a substantial point for being inserted in the support media 12. As illustrated both ends 22 and 21 are tapered to a substantial point whereby the device may be reversibly imbedded in the support media and each end is open at 22a and 21a, respectively, whereby the central bore 24 opens outwardly from each end.

A plurality of radial openings 26 are formed in the side wall of the tubular member 20 and extend perpendicularly to the bore 24 communicating the interior of the bore with the exterior surrounding of the tubular member 20. The radial openings 26 are spaced generally along the entire length of the tubular member 20. The spacing is important for distributing air outwardly from the bore 24 along the entire length thereof to aerate the media 12 at all levels thereof. A number of the openings 26 are disposed below the surface level 12a of the support media when implanted therein so that air from above the media level is delivered and distributed at different levels to the root system supported in the media. In an alternate form, the openings 26 may be formed obliquely to the axial bore 24 whereby the aerator tube may be inserted into the plant with the radial openings 25 slanted upwardly so as to prevent clogging by the support media during insertion.

In the case of excessive watering and/or improper drainage of water from the bottom of the container, decay of the root system often sets in. The aerator tube reduces decay in this case by delivering air to this excessively wet area of the pot to partially dry the media and reduce stagnation as well as aerate the root system. In the case of a normally watered plant, the aerator tube delivers air to the roots maintaining them in a healthy condition. With improper aeration of the roots, the roots tend to turn upwardly in the support media and grow toward the top of the support media 12a for additional oxygen. This results in a shallow weak root system inadequately anchored in the support media causing the plant to become easily dislodged. With the root system properly aerated by the aerator tube according to the invention, the root system grows downwardly and establishes a deep root system which is adequately anchored in the container pot 14.

Thus, it can be seen that an advantageous construction can be had for an aerator tube according to the invention for aerating the root system of a potted plant.

While a preferred embodiment of the invention has been described using specific terms, such description is for illustrative purposes only, and it is to be understood that changes and variations may be made without departing from the spirit or scope of the following claims.

What is claimed is:

1. An aerator tube for delivering air to the root system of an associated plant surrounded by a support media comprising:

an elongated tubular member having opposed ends;
a central axial bore extending generally between said ends;

at least one of said ends tapering inwardly toward the central axis of said tubular member and terminating at a substantial point for being inserted in said media;

a plurality of radial openings formed in a sidewall of said tubular member spaced generally along the entire length thereof communicating the interior of said axial bore with the exterior surrounding said tubular member;

a number of said openings being disposed below the surface of said support media when implanted in said media so that air from above said media level is delivered and distributed at different levels to the root system supported in said media; and the other of said opposing ends being tapered inwardly toward the center of said tubular member terminating substantially at a point, said axial bore extending through both of said tapered opposing ends opening outwardly therefrom.

2. The structure of claim 1 wherein said openings extend perpendicular to said axial bore.

* * * * *